United States Patent
Capriotti et al.

(10) Patent No.: US 12,319,453 B2
(45) Date of Patent: Jun. 3, 2025

(54) PACKAGING MACHINE WITH COAXIAL VALVE

(71) Applicant: MULTIVAC SEPP HAGGENMUELLER SE & CO. KG, Wolfertschwenden (DE)

(72) Inventors: Luciano Capriotti, Bad Groenenbach (DE); Herbert Kirmse, Wolfertschwenden (DE); Michael Hammer, Babenhausen (DE)

(73) Assignee: MULTIVAC Sepp Haggenmueller Se & Co. KG, Wolfertschwenden (DE)

( * ) Notice: Subject to any disclaimer, the term of this patent is extended or adjusted under 35 U.S.C. 154(b) by 4 days.

(21) Appl. No.: 18/202,076

(22) Filed: May 25, 2023

(65) Prior Publication Data
US 2023/0382578 A1 Nov. 30, 2023

(30) Foreign Application Priority Data
May 25, 2022 (DE) .......................... 102022113270.6

(51) Int. Cl.
*B65B 31/02* (2006.01)
*B65B 31/00* (2006.01)
(Continued)

(52) U.S. Cl.
CPC .............. *B65B 31/02* (2013.01); *B65B 57/00* (2013.01); *F16K 1/123* (2013.01); *F16K 3/265* (2013.01);
(Continued)

(58) Field of Classification Search
CPC .......... B65B 7/162; B65B 7/164; B65B 9/04; B65B 31/00; B65B 31/02; B65B 31/021;
(Continued)

(56) References Cited

U.S. PATENT DOCUMENTS 1,925,531 A * 9/1933 Grunsky ................. F16K 1/123
137/625.39
3,492,773 A * 2/1970 Bergstrom .............. B65B 31/02
53/433
(Continued)

FOREIGN PATENT DOCUMENTS

DE 10 2007 031 527 B3 6/2008
DE 10 2008 039 200 A1 2/2010
(Continued)

OTHER PUBLICATIONS

European Search Report re Application No. EP 23173026.8, Applicant: MULTIVAC Sepp Haggenmueller SE & Co. KG, dated Dec. 8, 2023 (with English machine translation) (14 pages).
(Continued)

Primary Examiner — Stephen F. Gerrity
(74) Attorney, Agent, or Firm — Brooks Kushman P.C.

(57) ABSTRACT

A packaging machine comprises at least one work station for processing at least one packaging part. The work station comprises a fluid line. The packaging machine comprises a valve for controlling a flow of fluid through the fluid line. The packaging machine comprises a control system for controlling the valve. The valve comprises a valve body with a flow channel. The valve comprises a blocking body which is movable in the flow channel along an axial direction between a closed position and an open position, wherein in the closed position a flow of fluid through the flow channel is prevented and in the open position a flow of fluid through the flow channel is enabled. The blocking body is configured to be flowed through by the fluid in the axial direction in the open position of the blocking body.

19 Claims, 3 Drawing Sheets

(51) Int. Cl.
*B65B 57/00* (2006.01)
*F16K 1/12* (2006.01)
*F16K 3/26* (2006.01)
*F16K 31/06* (2006.01)

(52) U.S. Cl.
CPC ...... *F16K 31/0651* (2013.01); *F16K 31/0668* (2013.01); *B65B 31/00* (2013.01)

(58) Field of Classification Search
CPC ..... B65B 31/028; B65B 31/04; B65B 31/043; B65B 57/00; F16K 1/123; F16K 3/265; F16K 31/0651; F16K 31/0668
USPC ............................ 53/433, 453, 511, 559, 561
See application file for complete search history.

(56) References Cited

U.S. PATENT DOCUMENTS

| | | | | |
|---|---|---|---|---|
| 3,744,210 | A * | 7/1973 | O'Lenick et al. | B65B 31/021 53/511 |
| 3,832,828 | A * | 9/1974 | Martin | B65B 31/021 53/511 |
| 4,012,888 | A * | 3/1977 | Nichols | B65B 47/02 53/131.5 |
| 4,216,938 | A | 8/1980 | Inada et al. | |
| 4,431,020 | A * | 2/1984 | Kowalski | F16K 1/123 137/486 |
| 4,777,782 | A * | 10/1988 | Nixon, Jr. et al. | B65B 31/021 53/511 |
| 8,091,322 | B2 | 1/2012 | Ehrmann et al. | |
| 11,111,040 | B2 | 9/2021 | Enderle et al. | |
| 2003/0146402 | A1 * | 8/2003 | Hirota | F25B 41/34 251/129.08 |
| 2003/0196412 | A1 * | 10/2003 | Foulke, Jr. | B65B 7/164 53/329.3 |
| 2013/0015386 | A1 * | 1/2013 | Schneider et al. | F16K 1/123 251/333 |
| 2017/0089484 | A1 * | 3/2017 | Müller | F16K 1/123 |
| 2020/0217428 | A1 * | 7/2020 | Steffensky et al. | F16K 31/0651 |
| 2020/0263798 | A1 * | 8/2020 | Volz et al. | F16K 1/123 |
| 2020/0332913 | A1 * | 10/2020 | Steffensky et al. | F16K 1/123 |
| 2022/0065352 | A1 | 3/2022 | Karl et al. | |

FOREIGN PATENT DOCUMENTS

| | | | |
|---|---|---|---|
| DE | 10 2010 048 901 A1 | 4/2012 | |
| DE | 102011010938 A1 * | 8/2012 | ......... F16K 31/0651 |
| DE | 10 2018 100 224 A1 | 7/2019 | |
| DE | 10 2018 116 507 A1 | 1/2020 | |
| EP | 0892202 A1 * | 1/1999 | ......... F16K 31/0651 |
| EP | 1703185 A1 * | 9/2006 | ............ F16K 1/123 |
| JP | 2010013147 A | 1/2010 | |
| WO | 2016207059 A1 | 12/2016 | |

OTHER PUBLICATIONS

German Office Action Dated Feb. 9, 2023, Application No. 10 2022 113 270.6, Applicant MULTIVAC Sepp Haggenmueller SE & Co. KG, 7 Pages.

* cited by examiner

PACKAGING MACHINE WITH COAXIAL VALVE

CROSS REFERENCE TO RELATED APPLICATIONS

This application claims foreign priority benefits under 35 U.S.C. § 119(a)-(d) to German patent application number DE 10 2022 113 270.6, filed May 25, 2022, which is incorporated by reference in its entirety.

TECHNICAL FIELD

The disclosure relates to a packaging machine with a work station comprising a fluid line, and to the operation of such a packaging machine.

BACKGROUND

From DE 10 2018 100 224 A1, a packaging machine with an atmosphere modifying station is known, by which an atmosphere within a package to be produced can be modified by evacuation and/or introducing a gas. The packaging machine has a pressure control device for modifying the atmosphere, which is configured to control an evacuation pressure and/or a pressure for introducing a gas. The pressure control device comprises a first preferably electrically controllable 2/2-way valve and a second preferably electrically controllable 2/2-way valve, wherein the first and the second 2/2-way valves are connected in parallel to each other and are individually controllable.

From DE 10 2008 039 200 A1, a vacuum valve for deep-drawing tools in packaging machines is known. The vacuum valve comprises a valve body, a flow channel penetrating the valve body and a sealing body. The sealing body is displaceable along an displacement path between an open position in the open condition and a closed position in the sealed condition of the flow channel. The sealing body comprises a sealing body surface which, in the closed condition of the sealing body, cooperates with a sealing surface of the valve body arranged in the area of the flow channel and includes an acute angle with the adjusting path.

SUMMARY

It is an object of the disclosure to provide a way of controlling a flow of fluid in a work station of a packaging machine efficiently and accurately.

According to an aspect of the disclosure, a packaging machine is provided. The packaging machine comprises at least one work station for processing at least one packaging part. The work station includes a fluid line. The packaging machine comprises a valve for controlling a flow of fluid through the fluid line. The packaging machine comprises a control system for controlling the valve. The valve comprises a valve body with a flow channel. The valve comprises a blocking body. The blocking body is movable in the flow channel along an axial direction between a closed position and an open position. In the closed position, a flow of fluid through the flow channel is prevented. In the open position, a flow of fluid through the flow channel is enabled. The blocking body is configured to allow fluid to flow through the blocking body in the axial direction when the blocking body is in the open position.

By means of the valve, the flow of fluid through the flow channel can be influenced. Since the blocking body is configured to be flowed through by fluid in the open position, there is no need to configure a flow path around or past the blocking body. Since the fluid flows through the blocking body along the axial direction in the open position of the blocking body, a deflection of the fluid while flowing through the valve can be kept low. By flowing through the blocking body in the axial direction, turbulence of the fluid while flowing through the valve can be avoided or reduced.

Since moving the blocking body between the closed position and the open position takes place in the flow channel and along the axial direction, fouling of the valve, for example due to deposits, can be at least partially avoided. It is not necessary to provide a separate space into which the valve body can at least partially enter in the open position. Thus, the valve can be configured largely free of dead space.

When the blocking body is in the closed position, there may be different pressure conditions in the flow channel on opposite sides of the blocking body. Due to the different pressure conditions, a force can act on the blocking body. Preferably, the blocking body in the closed position is oriented in the flow channel such that the force has no axial component. With such an arrangement, the blocking body can be moved along the axial direction from the closed position without having to overcome a force resulting from the different pressure regimes on both sides of the blocking body. The blocking body can thus be moved particularly smoothly and with fast reactions.

A direction of action of a force acting on the blocking body in the closed position due to different pressure regimes on opposite sides of the blocking body may be inclined relative to the axial direction by at least 5 degrees, or by at least 10 degrees, or by at least, 20 degrees, or by at least 30 degrees, or by at least 40 degrees, or by at least 50 degrees, or by at least 60 degrees, or by at least 70 degrees, or by at least 80 degrees, or by substantially 90 degrees. If the force on the blocking body generated by the pressure difference on opposite sides of the blocking body in the closed position of the blocking body is inclined with respect to the axial direction, the blocking body does at least not have to overcome the full force when the blocking body is moved along the axial direction.

The valve can be configured to be selectively operated with different flow directions depending on an application. The different flow directions can be opposite flow directions.

The blocking body may comprise a blocking body passage. The blocking body passage may be configured to be flowed through by the fluid in the axial direction when the blocking body is in the open position. The blocking body passage may extend along the axial direction. The blocking body passage may extend parallel to the axial direction from a first end of the blocking body to a second end of the blocking body. The blocking body passage may define a flow cross-section of the blocking body. For example, the blocking body passage may define a circular flow cross-section or an oval flow cross-section or a rectangular flow cross-section or an irregularly shaped flow cross-section. The flow cross-section may be symmetrical with respect to the axial direction.

The blocking body, in particular the blocking body passage, can have a flow cross-section of between 50 square millimeters and 500 square millimeters. The flow cross-section of the blocking body may be constant along the axial direction. If the flow cross-section of the blocking body changes along the axial direction, the minimum flow cross-section of the blocking body along the axial direction may be between 50 square millimeters and 500 square millimeters.

The blocking body may be at least substantially tubular. The blocking body can be configured as a circular tube or as an oval tube or as a rectangular tube or as an irregularly shaped tube. A tubular configuration of the blocking body may at least reduce formation of deposits on the blocking body or in the region of the blocking body.

The flow channel may extend along the axial direction from a fluid inlet of the valve to a fluid outlet of the valve. The flow channel may be configured to be flowed through by the fluid along the axial direction. When both the flow channel and the blocking body are flowed through by the fluid along the axial direction, a low flow resistance can be realized in the open position.

The fluid can flow through the flow channel by flowing through the blocking body present in the flow channel.

A valve seat may be provided in the flow channel. The blocking body can seal against the valve seat in the closed position. A sealing contact surface between the blocking body and the valve seat can, for example, run perpendicular to the axial direction or be inclined relative to the axial direction. A sealing contact surface between the blocking body and the valve seat can, for example, run parallel to the axial direction.

The valve seat can be integrally configured with the valve body. The valve seat can be attached to the valve body.

The control system can be configured to adjust an opening degree of the valve. The control system can be configured to adjust an opening degree of the valve in a stepless manner. The control system can be configured to adjust the blocking body between the closed position and the open position of the blocking body in a stepless manner.

The valve may comprise a valve drive. The valve drive can be configured to move the blocking body. The valve drive can be configured to move the blocking body without contact. The valve drive can be configured to move the blocking body by applying or changing a magnetic field. A permanent magnet may be part of the blocking body, or permanently attached to the blocking body, or integrated into the blocking body. The valve drive may comprise an electric coil configured to generate a magnetic field. By means of the magnetic field, a force can be exerted on the permanent magnet to move the blocking body.

The valve can comprise a preload element. The preload element can be configured as a spring, for example. The preload element can pretension the blocking body into the closed position. The valve may move the blocking body to the closed position and/or hold it in the closed position in a de-energized condition of the valve. In the event of a malfunction, for example a failure of the valve drive, the valve can move the blocking body to the closed position and/or hold it in the closed position. The valve drive may be configured to exert a force on the blocking body directed against the pretension by the preload element. The valve drive may be configured to modify a force acting on the blocking body against the pretension through the preload element to adjust a position of the blocking body.

The preload element may be provided in a preload element chamber of the valve body. The preload element chamber may be in fluid communication with a fluid inlet of the valve. The preload element chamber may be in fluid communication with a fluid inlet of the valve in the closed position and/or in the open position of the blocking body. By means of a flow connection between the preload element chamber and the fluid inlet of the valve, a pressure equalization between the preload element chamber and the fluid inlet of the valve can take place. The pressure equalization can facilitate displacement of the blocking body by the preload element. In particular, the blocking body can be more easily displaced by the preload element in the direction of the fluid inlet of the valve due to the pressure equalization.

The valve drive may be configured to move the blocking body to at least one intermediate position between the closed position and the open position. In the intermediate position, a flow of fluid through the flow channel may be partially enabled. A flow rate of fluid through the flow channel can be adapted depending on a respective operating situation of the packaging machine and/or the work station by the control system by suitably displacing the blocking body.

The control system can be configured to control the valve drive electrically. The control system can be configured to control the valve drive using pulse width modulation (PWM). A control of the valve drive by means of pulse width modulation can take place in a fast reaction manner and steplessly. The control system can be configured to set an opening degree of the valve by controlling the valve drive using pulse width modulation. The control system can be configured to set a position of the blocking body along the axial direction by controlling the valve drive by means of pulse width modulation. In particular, an opening degree of the valve can be determined by the pulse width. Pulse width modulation can be performed at a frequency high enough that the valve position remains at least substantially unchanged during a scanning cycle. Alternatively, control could take place with a low-frequency square-wave voltage, for example to adjust the valve in a specific time sequence between the fully open condition and the fully closed condition.

The packaging machine may include a data memory. The data memory may contain a look-up table. The look-up table may store a relationship between an opening degree of the valve and a pulse width. The control system may be configured to determine a corresponding pulse width based on a target valve opening degree from the look-up table and to control the valve drive with the determined pulse width.

For example, the packaging machine may be configured as a deep-drawing packaging machine, or a tray-sealing machine, or a form fill and seal machine, or a pouch chamber machine.

The work station can, for example, be configured as a forming station or a sealing station. The forming station can be configured to form packaging troughs in a film web to receive one or more products, in particular by deep drawing. The sealing station can be configured to seal packaging troughs filled with one or more products by sealing a cover film.

The packaging machine can comprise an underpressure source, in particular a vacuum pump. The underpressure source may be connected to the fluid line to supply the work station with underpressure. For example, the underpressure source may supply a sealing station (work station) with underpressure for at least partially evacuating a package to be sealed. By changing the opening degree of the valve, an evacuation rate and/or a gas flow from the packaging can be set. For example, the underpressure source can supply a forming station (work station) with underpressure for forming a packaging element, in particular a film element. By changing the opening degree of the valve, a strength of the vacuum applied in the forming station can be set, in particular set as a function of time.

The packaging machine may comprise a gas source. The gas source may be connected to the fluid line to supply gas to the work station. The gas source may be configured to supply gas to a sealing station (work station) for introducing gas into a package. By setting the opening degree of the valve, an injection rate of the gas into the package or a volumetric flow rate of the gas into the package can be adapted. For example, the gas source can supply a forming station (work station) with compressed gas, in particular compressed air, for forming a packaging element, in particular a film element. By changing the opening degree of the valve, a strength of the gas pressure applied in the forming station can be set, in particular set as a function of time.

The valve may be part of the work station. Alternatively, the valve may be provided outside the work station, for example in a line connected to the fluid line of the work station.

The fluid may be or comprise a gas. For example, the fluid may be or comprise air. The fluid may be, for example, an inert gas or comprise an inert gas.

The fluid may be a liquid or comprise a liquid. For example, the fluid may comprise a cooling liquid for cooling one or more components of the work station. For example, the fluid may comprise a heating liquid for heating one or more components of the work station.

The control system can be part of the work station. The control system can be attached to the work station. The control system can be provided spaced apart from the work station. The control system can be configured as part of an overall control system for the packaging machine. The control system may be connected to a superordinate control system of the packaging machine. The control system may comprise one or more microprocessors. The control system may comprise one or more memory units.

According to another aspect of the disclosure, a method for operating a packaging machine is provided. A flow of fluid through a fluid line of a work station of the packaging machine is controlled by moving a blocking body of a valve in a valve body of the valve along an axial direction. Fluid flows through the blocking body of the valve along the axial direction in an at least partially open position of the valve. In a closed position of the valve, the blocking body of the valve is not flowed through by the fluid along the axial direction.

Controlling the flow of fluid through the fluid line by moving the blocking body can be carried out by a control system.

The work station can be a sealing station. In the sealing station, packages can be sealed by sealing a cover film. The fluid may be a gas. The fluid can be blown into the packages through the fluid line or sucked out of the packages before sealing the packages.

During a working cycle of the work station or the packaging machine, an opening degree of the valve can initially be maintained at a first opening degree for a first period of time by moving the blocking body. Then, the opening degree of the valve may be increased to a second opening degree for a second period of time. Then, the opening degree of the valve may be maintained at a third opening degree for a third period of time. The third opening degree may be a lower opening degree than the second opening degree. The first time period, the second time period, and the third time period may follow each other directly or spaced apart in time.

For example, during an evacuation process of a package, gas can be sucked out of the package through the fluid line with a comparatively low opening degree of the valve during the first time period in order to at least partially avoid entrainment or turbulence of product. During the second time period, the opening degree can be increased, since, due to the already reduced amount of gas in the package, entrainment or turbulence of product is less likely. In the third time period, gas can be sucked out of the package through the fluid line with a reduced opening degree of the valve compared to the second time period, in order to be able to set a final pressure in the package as accurately as possible.

According to another aspect of the disclosure, a use of a proportionally controlled coaxial valve is provided. The proportionally controlled coaxial valve is used to adjust a suction speed or an injection speed of gas in a work station of a packaging machine in a fast reaction manner, or to achieve a precisely defined final pressure when sucking or injecting gas in a work station of a packaging machine.

The proportionally controlled coaxial valve may comprise a valve body with a flow channel. The proportionally controlled coaxial valve may include a blocking body. The blocking body may be movable in the flow channel along an axial direction between a closed position and an open position. In the closed position, a flow of fluid through the flow channel may be prevented. In the open position, flow of fluid through the flow channel may be enabled.

The blocking body may be configured to allow fluid to flow through blocking body in the axial direction when the blocking body is in the open position.

Consistent with the aspects described, the disclosure relates to a packaging machine, a method of operating a packaging machine, and a use of a proportionally controlled coaxial valve. Features and explanations described with respect to one of these aspects can be transferred to the other aspects.

The packaging machine may be suitable, adapted and/or configured for carrying out the method and/or for carrying out the use. The method can be carried out by means of the packaging machine. The use may be performed by means of the packaging machine. The use may comprise carrying out the method. The method may comprise the use.

BRIEF DESCRIPTION OF THE DRAWINGS

In the following, embodiments according to the disclosure are described with reference to the Figures.

DETAILED DESCRIPTION

Figure 1:
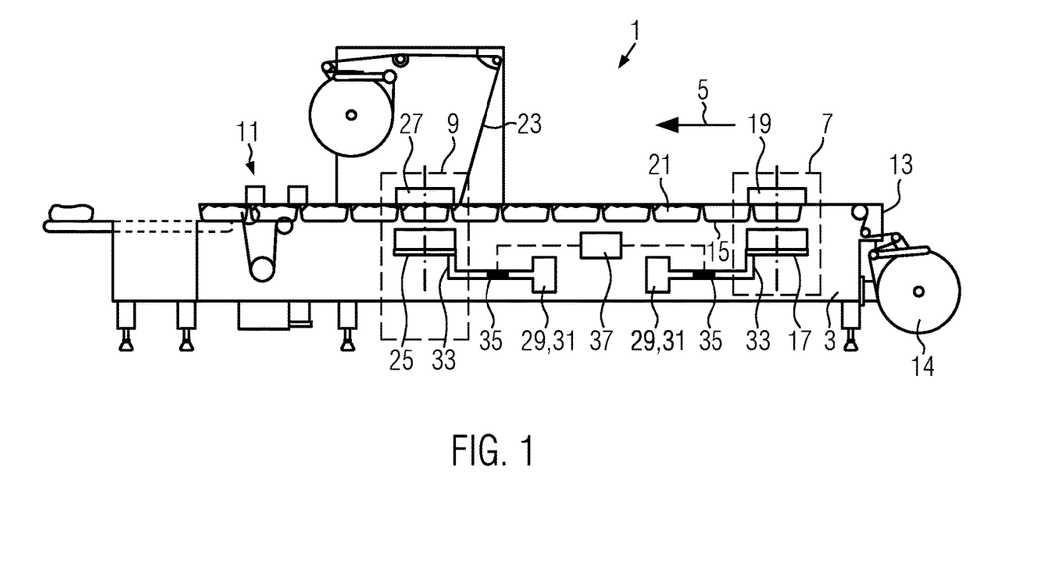
FIG. 1 shows a schematic side view of a packaging machine according to an embodiment.

FIG. 1 shows a packaging machine 1 according to an embodiment. The packaging machine 1 shown is configured as a deep-drawing packaging machine. Alternatively, the disclosure can also be applied to other packaging machines, for example to a tray sealing machine or a form fill and seal machine.

The packaging machine 1 in the illustrated embodiment comprises a machine frame 3 on which a forming station 7, a sealing station 9 and a cutting station 11 are arranged one behind the other along a production direction 5. A lower film web 13 is unwound from a supply roll 14 and conveyed along the production direction 5 successively through the forming station 7, the sealing station 9 and the cutting station 11.

In the forming station 7, packaging troughs 15 are formed in the lower film web 13 by deep drawing. The forming station 7 comprises a forming tool lower part 17 and a forming tool upper part 19, which cooperate to form the packaging troughs 15. Between the forming station 7 and the sealing station 9, products 21 to be packaged are inserted into the packaging troughs 15. In the sealing station 9, the filled packaging troughs 15 are sealed by sealing a cover film 23 to the lower film 13. The sealing station 9 comprises a sealing tool lower part 25 and a sealing tool upper part 27. The sealing tool lower part 25 and the sealing tool upper part 27 cooperate to seal the cover film 23 to the lower film web 13. The sealing takes place in particular under the effect of pressure and/or heat. In the cutting station 11, the sealed packages are separated from the film composite.

In order to support the forming process, the forming station 7 may be connected to an underpressure source 29. The underpressure source 29 may generate an underpressure that facilitates placement of the lower film web 13 against a surface of the forming tool lower part 17 or the forming tool upper part 19. Alternatively or additionally, the forming station 7 may be connected to a gas source 31 to assist in the forming process. The gas source 31 may provide gas that presses the lower film web 13 against a surface of the sealing tool lower part 17 or the sealing tool upper part 19.

To evacuate the packages prior to sealing, the sealing station 9 may be connected to an underpressure source 29. Alternatively or additionally, the sealing station 9 may be connected to a gas source 31 which provides a gas for filling the packages prior to sealing the packages.

In the illustrated embodiment, both the forming station 7 and the sealing station 9 are connected to an underpressure source 29 and/or a gas source 31. Alternatively, for example, only the forming station 7 or only the sealing station 9 could be connected to an underpressure source 29 and/or a gas source 31. In an alternative embodiment, the forming station 7 and the sealing station may share an underpressure source 29 or a gas source 31.

The respective underpressure source 29 or gas source 31 can provide underpressure or gas to the forming station 7 or the sealing station 9 via a fluid line 33. The fluid line 33 can be partially or completely part of the forming station 7 or the sealing station 9. The underpressure source 29 or gas source 31 may be directly connected to the fluid line 33. Alternatively, a connecting line may connect the underpressure source 29 or the gas source 31 to the fluid line 33. A valve 35 is arranged in the flow connection between the underpressure source 29 or the gas source 31 and the forming station 7 or the sealing station 9, which regulates a gas flow through the fluid line 33. In particular, the valve 35 may be provided in the fluid line 33 or in a connecting line between the fluid line 33 and the underpressure source 29 or the gas source 31.

In the illustrated embodiment, the valves 35 are controlled by a control system 37.

Figure 2:
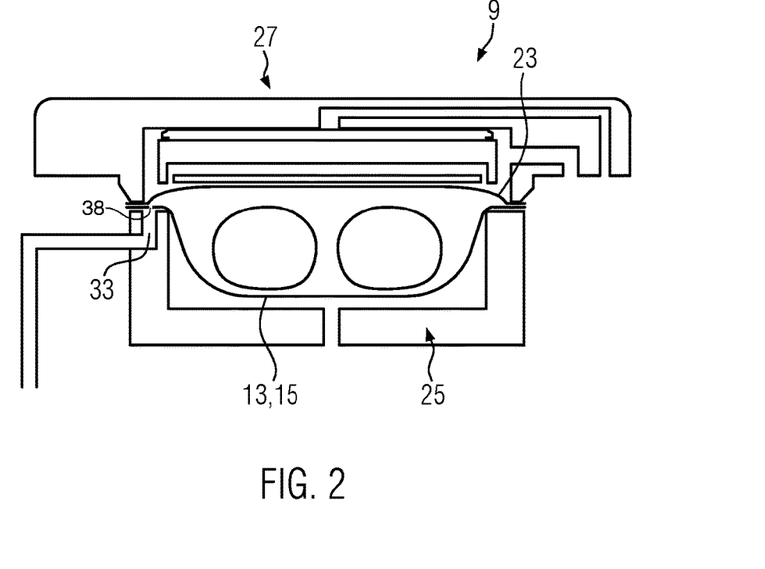
FIG. 2 shows a schematic sectional view of a work station of a packaging machine configured as a sealing station according to an embodiment.

FIG. 2 shows a schematic sectional view of the sealing station 9. It is shown that the fluid line 33 is connected to the interior of the package via at least one opening 38 provided in the lower film web 13 in order to inject gas into the package or to evacuate the package. Then, the package is sealed by sealing the cover film 23 to the lower film web 13.

Figure 3:
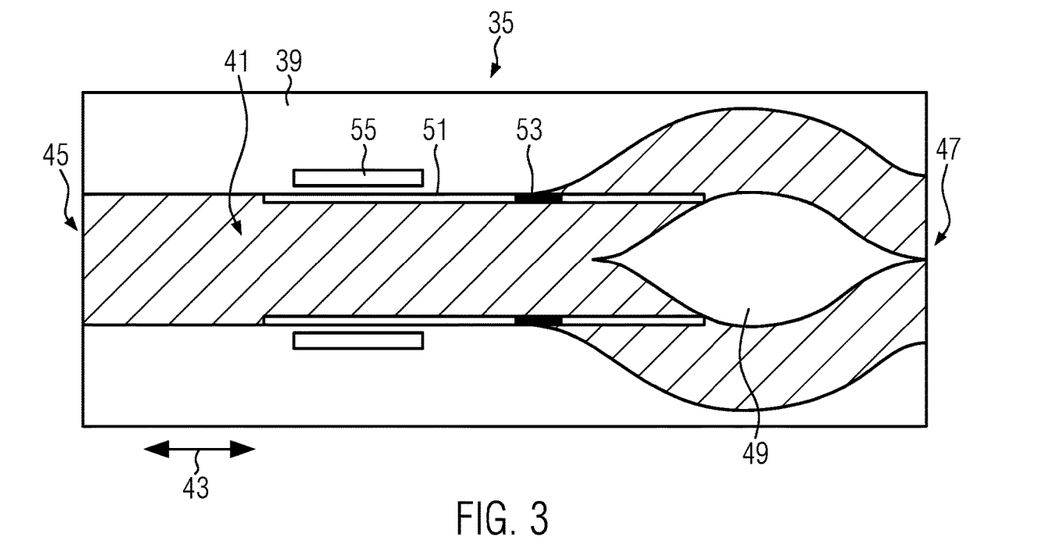
FIG. 3 shows a valve of a work station of a packaging machine according to an embodiment in a closed position.
Figure 4:
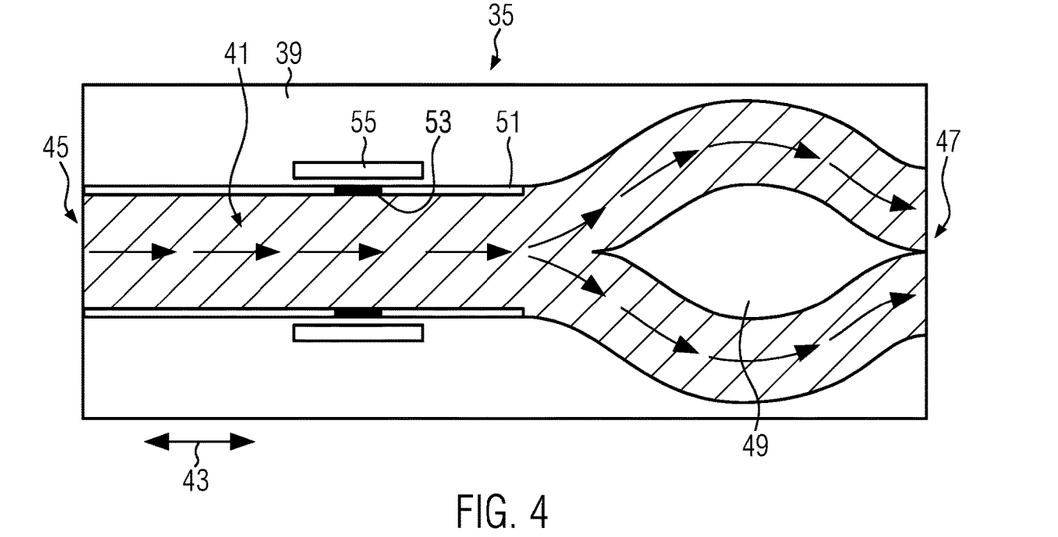
FIG. 4 shows the valve from FIG. 3 in an open position.

FIGS. 3 and 4 show a first embodiment of the valve 35 in a sectional view, wherein the sectional plane is parallel to an axial direction 43. In FIG. 3, the valve 35 is closed so that no fluid flow occurs through the fluid line 33. In FIG. 4, the valve 35 is open so that fluid can flow through the fluid line 33.

The valve 35 comprises a valve body 39 with a flow channel 41. The flow channel 41 extends along the axial direction 43 from a fluid inlet 45 to a fluid outlet 47. A valve seat 49 is provided in the flow channel 41. A blocking body 51 is movable in the flow channel 41 along the axial direction 43.

In the illustrated embodiment, a permanent magnet 53 is embedded in the blocking body 51. An electric coil 55 is provided outside the flow channel 41. The blocking body 51 is pretensioned by a preload element (not shown in FIGS. 3 and 4) to the closed position shown in FIG. 3. In the closed position, the blocking body 51 is in sealing engagement with the valve seat 49, thereby preventing fluid from flowing through the flow channel 41.

In order to at least partially open the valve 35, the control system 37 causes a current to flow through the electric coil 55. This generates a magnetic field through which a force acts on the permanent magnet 53 embedded in the blocking body 51. By this force, the blocking body 51 is moved along the axial direction 43 (from right to left in FIG. 3) to at least partially enable a flow of fluid through the flow channel 41.

In FIG. 4, the valve 35 is shown in an open position in which the blocking body 51 completely enables the flow of fluid through the flow channel 41. Preferably, the blocking body is steplessly adjustable between the open position shown in FIG. 3 and the closed position shown in FIG. 4. In particular, an opening degree of the valve 35 can be set by the control system 37 using pulse width modulation. Depending on the pulse width, the strength of the magnetic field generated by the electric coil 55 can vary. Depending on the strength of the magnetic field, a corresponding force is applied to the blocking body 51 against the pretension. In each case, a balance arises between the pretension by the preload element, in particular a spring, and the force generated by the magnetic field, which corresponds to a certain opening degree of the valve 35.

Figure 5:
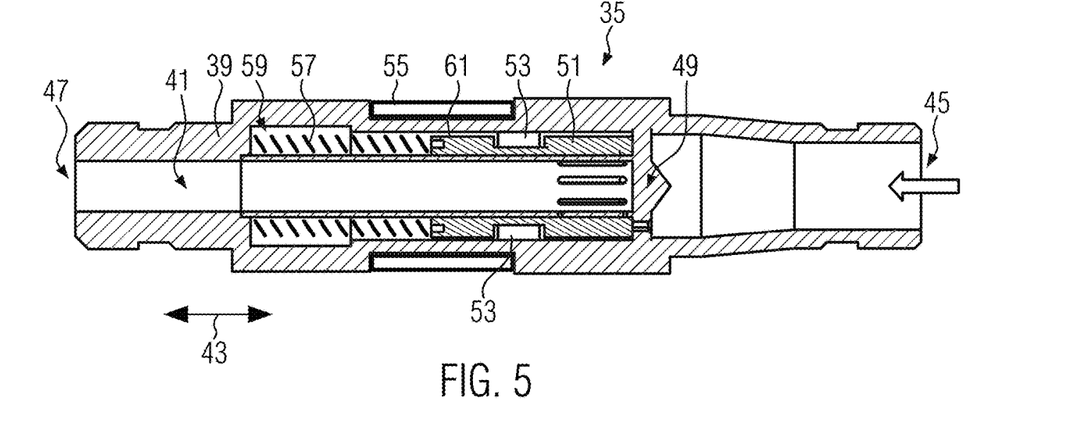
FIG. 5 shows a valve of a work station of a packaging machine according to another embodiment in a closed position.
Figure 6:
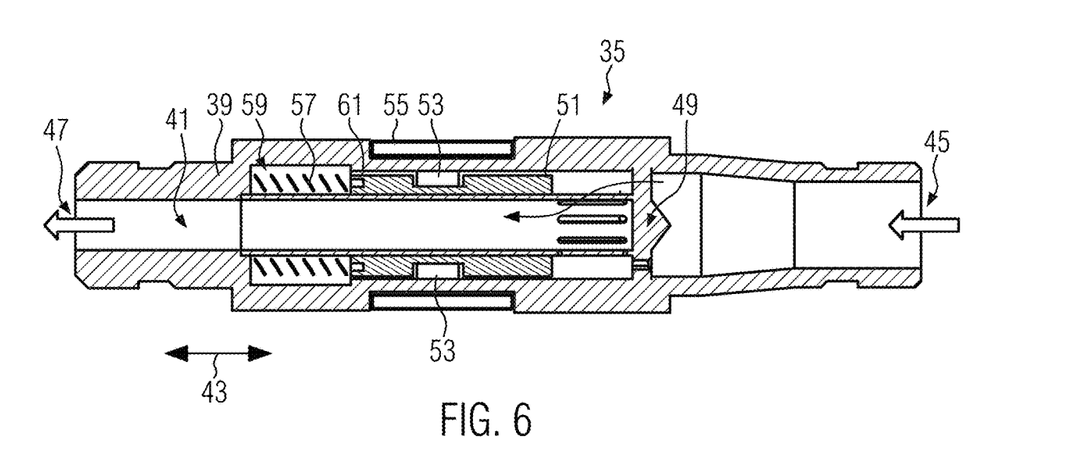
FIG. 6 shows the valve from FIG. 5 in an open position.

FIGS. 5 and 6 show a second embodiment of valve 35. This differs from the valve shown in FIGS. 3 and 4 essentially in the configuration of the valve seat 49.

In FIG. 5, the valve 35 is closed so that fluid does not flow through the fluid line 33. In FIG. 6, the valve 35 is open so that fluid can flow through the fluid line 33.

The valve 35 comprises a valve body 39 with a flow channel 41. The flow channel 41 extends along the axial direction 43 from a fluid inlet 45 to a fluid outlet 47. A valve seat 49 is provided in the flow channel 41. A blocking body 51 is movable in the flow channel 41 along the axial direction 43.

In the illustrated embodiment, a permanent magnet 53 is embedded in the blocking body 51. An electric coil 55 is provided outside the flow channel 41. The blocking body 51 is pretensioned by a preload element 57 (e.g., a spring) into the closed position shown in FIG. 5. In the closed position, the blocking body 51 is in sealing engagement with the valve seat 49, preventing fluid from flowing through the flow channel 41.

The preload element 57 is provided in a preload element chamber 59 of the valve body 39. The preload element chamber 59 is in flow communication with the fluid inlet 45 via a bypass 61. The flow connection between the preload element chamber 59 and the fluid inlet 45 allows pressure equalization between the preload element chamber 59 and the fluid inlet 45, thereby facilitating displacement of the blocking body by the preload element. In particular, the blocking body 51 can be moved more easily to the closed position due to the pressure equalization by the preload element 57.

In order to at least partially open the valve 35, the control system 37 causes a current to flow through the electric coil 55. This generates a magnetic field through which a force acts on the permanent magnet 53 embedded in the blocking body 51. By this force, the blocking body 51 is moved along the axial direction 43 against the pretension by the preload element 57 (from right to left in FIG. 5) to at least partially enable a flow of fluid through the flow channel 41.

In FIG. 6, the valve 35 is shown in an open position in which the blocking body 51 fully enables the flow of fluid through the flow channel 41.

As those skilled in the art will understand, the control system 37, as well as any other controller, unit, component, module, system, subsystem, interface, sensor, device, or the like described herein may individually, collectively, or in any combination comprise appropriate circuitry, such as one or more appropriately programmed processors (e.g., one or more microprocessors including central processing units (CPU)) and associated memory, which may include stored operating system software, firmware, and/or application software executable by the processor(s) for controlling operation thereof and for performing the particular algorithm or algorithms represented by the various methods, functions and/or operations described herein, including interaction between and/or cooperation with each other. One or more of such processors, as well as other circuitry and/or hardware, may be included in a single Application-Specific Integrated Circuitry (ASIC) or Electronic Control Unit (ECU), or several processors and various circuitry and/or hardware may be distributed among several separate components, whether individually packaged or assembled into a System-on-a-Chip (SoC).

What is claimed is:

1. A packaging machine, wherein:
   the packaging machine comprises a work station for processing at least one packaging part;
   the work station comprises a fluid line;
   the packaging machine comprises a valve for controlling a flow of fluid through the fluid line;
   the packaging machine comprises a control system for controlling the valve;
   the valve comprises a valve body with a flow channel;
   the valve comprises a blocking body which is movable in the flow channel along an axial direction between a closed position and an open position, wherein in the closed position a flow of fluid through the flow channel is prevented and in the open position a flow of fluid through the flow channel is enabled;
   wherein a valve seat integrally configured with the valve body is formed in the flow channel, wherein the blocking body seals against the valve seat in the closed position; and
   wherein the blocking body is configured to be flowed through by the fluid in the axial direction in the open position of the blocking body, the blocking body defines a blocking body passage configured to be flowed through by the fluid in the axial direction when the blocking body is in the open position, and the blocking body passage defines a flow cross-section of the blocking body.

2. The packaging machine according to claim 1, wherein the flow cross-section is between 50 square millimeters and 500 square millimeters.

3. The packaging machine according to claim 1, wherein the blocking body is at least substantially tubular.

4. The packaging machine according to claim 1, wherein the blocking body in the closed position is oriented in the flow channel such that a force acting on the blocking body in the closed position due to different pressure conditions in the flow channel on opposite sides of the blocking body has no axial component.

5. The packaging machine according to claim 1, wherein the control system is configured to adjust an opening degree of the valve in a stepless manner.

6. The packaging machine according to claim 1, wherein the valve comprises a valve drive configured to move the blocking body.

7. The packaging machine according to claim 6, wherein the valve drive is configured to move the blocking body to at least one intermediate position between the closed position and the open position, wherein in the at least one intermediate position a flow of fluid through the flow channel is partially enabled.

8. The packaging machine according to claim 6, wherein the control system is configured to adjust an opening degree of the valve by controlling the valve drive by pulse width modulation.

9. The packaging machine according to claim 1, wherein the work station is configured as a forming station or as a sealing station.

10. The packaging machine according to claim 1, wherein the packaging machine comprises an underpressure source or a gas source, wherein the underpressure source or the gas source is connected to the fluid line for supplying the work station with underpressure or with gas.

11. The packaging machine according to claim 1, wherein
    the valve further comprises a preload element configured to pretension the blocking body into the closed position;
    the preload element is provided in a preload element chamber of the valve body; and
    the preload element chamber is in fluid communication with a fluid inlet of the valve.

12. A method for operating a packaging machine, comprising:
    sealing packages in a sealing station of the packaging machine by sealingly attaching a cover film; and
    sucking a gas out of the packages before sealing the packages, comprising controlling a flow of the gas through a fluid line of the sealing station by moving a blocking body of a valve in a valve body of the valve along an axial direction, wherein the blocking body of the valve is flowed through by the gas along the axial direction in an at least partially opened position of the valve, but not in a closed position of the valve;
    wherein moving the blocking body during a working cycle of the sealing station comprises:
    first, keeping an opening degree of the valve at a first opening degree for a first period of time;
    then increasing the opening degree of the valve to a second opening degree for a second period of time; and
    then keeping the opening degree of the valve at a third opening degree for a third period of time, wherein the third opening degree is a lower opening degree than the second opening degree.

13. A packaging machine comprising:
    a work station for processing at least one packaging part, wherein the work station comprises a fluid line; and
    a valve for controlling a flow of fluid through the fluid line, wherein the valve comprises a valve body with a flow channel, and a blocking body which is movable in the flow channel along an axial direction between a closed position and an open position, wherein in the closed position a flow of fluid through the flow channel is prevented, and in the open position a flow of fluid through the flow channel is enabled, and wherein the blocking body is configured to allow fluid to flow through the blocking body in the axial direction in the open position of the blocking body;

wherein the valve further comprises a preload element configured to pretension the blocking body into the closed position;

wherein the preload element is provided in a preload element chamber of the valve body; and wherein the preload element chamber is in fluid communication with a fluid inlet of the valve.

14. The packaging machine according to claim 13, wherein the blocking body in the closed position is oriented in the flow channel such that a force acting on the blocking body in the closed position due to different pressure conditions in the flow channel on opposite sides of the blocking body has no axial component.

15. The packaging machine according to claim 13, wherein a valve seat is formed in the flow channel, wherein the blocking body seals against the valve seat in the closed position.

16. The packaging machine according to claim 13, wherein the work station is configured as a forming station or as a sealing station.

17. The packaging machine according to claim 13, wherein the blocking body defines a blocking body passage configured to be flowed through by the fluid in the axial direction when the blocking body is in the open position, and the blocking body passage defines a flow cross-section of the blocking body.

18. The packaging machine according to claim 13, wherein the preload element is configured as a spring.

19. The packaging machine according to claim 13, wherein the preload element chamber is in fluid communication with the fluid inlet of the valve both in the closed position and in the open position of the blocking body.

* * * * *